United States Patent [19]

Bachem et al.

[11] Patent Number: 5,242,596

[45] Date of Patent: Sep. 7, 1993

[54] PROCESS FOR CONCENTRATING LATEX DISPERSIONS

[75] Inventors: Henning Bachem, Cologne, South Africa; Anno Borkowsky, Huerth, Fed. Rep. of Germany; Heinrich Grave, Bergisch Gladbach, Fed. Rep. of Germany; Dietrich Tegtmeyer, Koeln, Fed. Rep. of Germany; Bernd von der Linden, Leverkusen, Fed. Rep. of Germany

[73] Assignee: Bayer Aktiengesellschaft, Leverkusen-Bayerwerk, Fed. Rep. of Germany

[21] Appl. No.: 921,121

[22] Filed: Jul. 29, 1992

[30] Foreign Application Priority Data

Aug. 10, 1991 [DE] Fed. Rep. of Germany ....... 4126483

[51] Int. Cl.$^5$ .............................................. B01D 61/14
[52] U.S. Cl. .................................. 210/644; 210/651; 210/195.2; 210/257.2
[58] Field of Search ............... 210/639, 636, 634, 644, 210/649-654, 195.2, 257.2

[56] References Cited

U.S. PATENT DOCUMENTS 4,160,726 7/1979 Del Pico .............................. 210/639
4,340,702 7/1982 Huddleston et al. ................ 210/636

OTHER PUBLICATIONS

K. Gäfgen; Chem. Ind., 3 (1977).
Abcor, Process Bulletin, PIB 249 (1975).
Abcor, Process Bulletin, PIB 250 (1976).
J. Zahka and L. Mir; Chem. Eng. Progress 12, 53 (1977).
J. J. S. Shen and L. Mir; Ind. Eng. Prod. Res. Dev., 21(1), 63 (1982).

*Primary Examiner*—Frank Sever
*Attorney, Agent, or Firm*—Connolly and Hutz

[57] ABSTRACT

Latex dispersions are concentrated by a process in which, in a two-stage crossflow filtration, the latex dispersion is first concentrated under pressures of 2 to 7 bar and at temperatures of 20° to 70° C. under turbulent flow conditions, the permeate accumulating together with the emulsifier present therein is then also concentrated at 10 to 40 bar and at temperatures of 20° to 50° C. and the concentrate obtained is returned with the emulsifier to the first stage of the crossflow filtration process while the permeate of the second stage is returned to the production process.

3 Claims, No Drawings

PROCESS FOR CONCENTRATING LATEX DISPERSIONS

This invention relates to a process for concentrating latex dispersions by two-stage crossflow filtration.

It is known (see for example (1) K. Gäfgen; Chem. Ind., 3 (1977), (2) Abcor, Process Bulletin, PIB 249 (1975), (3) Abcor, Process Bulletin, PIB 250 (1976), (4) J. Zahka and L. Mir; Chem. Eng. Progress 12, 53 (1977), (5) J.J.S Shen and L. Mir; Ind. Eng. Prod. Res. Dev., 21(1), 63 (1982)) that latex-containing emulsions or latex-containing wastewaters can be worked up by ultrafiltration. The disadvantage of existing processes is that emulsifiers, which are used to stabilize the latex and which are present in the emulsions to be worked up, are separated off which leads to losses of stability in the worked-up and concentrated latex emulsions and is accompanied by contamination of the wastewaters with organic substances and inorganic salts.

A process for concentrating latex dispersions has now been found and is characterized in that, in a two-stage crossflow filtration, the latex dispersion is first concentrated under pressures of 2 to 7 bar and at temperatures of 20° to 70° C. under turbulent flow conditions, the permeate accumulating together with the emulsifier present therein is then also concentrated at 10 to 40 bar and at temperatures of 20° to 50° C. and the concentrate obtained is returned with the emulsifier to the first stage of the crossflow filtration process. The permeate of the second stage is generally so clean that it may be returned as process water to the production process.

The crossflow filtration of both stages corresponds to the typical pressure permeation arrangement described, for example, in K. Marquardt, Abfallwirtschaft Journal 2 (1990), No. 4.

The crossflow filtration carried out in accordance with the invention is preferably carried out at temperatures of 35° to 45° C. and under pressures of 4 to 5 bar in the first stage.

The crossflow filtration of the second stage is preferably carried out under pressures of 14 to 16 bar and at temperatures of 30° to 40° C.

In the process according to the invention, the crossflow filtration of the first stage is preferably carried out by ultrafiltration or microfiltration. The fine-pore membranes used for ultrafiltration have cutoff limits of 1,000 to 150,000 dalton and preferably 50,000 to 100,000 dalton.

The membranes used for microfiltration have a pore size of 0.01 to 0.5 μm and preferably 0.2 to 0.1 μm.

The crossflow filtration of the second stage of the process according to the invention is carried out in the form of reverse osmosis or in the form of nanofiltration. Membranes having cutoff limits below 300 dalton and preferably below 150 dalton are used for reverse osmosis.

If nanofiltration is carried out in the second stage, membranes having a cutoff limit of 150 to 1,000 dalton and preferably 300 to 500 dalton are used.

The two-stage crossflow filtration according to the invention is carried out in membrane units in which the membranes are combined to form various modules. For example, it is possible to use units comprising tubular or tube modules, capillary modules, wound modules or tubular disk modules.

The membranes may be made from a range of materials. They are either made of organic materials or of inorganic materials. Information on the theory and application of membrane processes and on module design and membrane materials can be found inter alia in H. Strathmann; Chemie Technik 7, 33 (1978), W. Pusch and A. Walch; Angew. Chem. 94, 670 (1982), K. Marquardt, Abfallwirtschaft Journal 2 (1990) No. 4, pages 177 et seq. or R. Rautenbach and A. Räschl; Technische Mitteilungen, Vol. 82, No. 6, Nov./Dec. 1989, pages 400 et seq.

Suitable organic membrane materials for the crossflow filtration of the first stage are, for example, polyvinylidene fluoride, cellulose acetate, polytetrafluoroethylene, polyacrylonitrile, polyethyleneimine, copolymers of polyacrylonitrile and vinyl pyrrolidone, polysulfone, polyamide, polyhydantoin or even hydrophilicized polyolefins, for example based on polypropylene. Chemically modified polyacrylonitrile membranes (see for example EP 25 973) which are obtained, for example, by reaction of the basic polymer with hydroxylamine, a polyfunctional low molecular weight compound, a polymer containing reactive groups and an ionic compound capable of entering into a chemical bond with the polymer and which are subsequently treated with active chlorine, for example in the form of a hypochlorite solution, are also suitable as membranes for the crossflow filtration of the first stage.

Inorganic membranes are, for example, those of porous metal or metal alloys (so-called metal sinter membranes, for example of porous steel) or those of porous plastic, of which the surface may be coated, for example, with a thin layer of zirconium oxide, silicon or aluminium oxide, or of porous glass or ceramic.

The following membranes, for example, are preferably used for ultrafiltration (the figures in brackets indicate the cutoff): polyacrylonitrile membrane (approx. 100,000 dalton), cellulose acetate membrane (approx. 5,000 to 20,000 dalton), polysulfone membrane (approx. 10,000 dalton), zirconium oxide membrane (approx. 20,000 to 100,000 dalton).

The following membranes are preferably used for microfiltration in the first stage (the figures in brackets indicate the pore sizes): PTFE (approx. 0.02–0.5 μm), polypropylene (approx. 0.02–0.5 μm) and zirconium oxide (0.1–0.5 μm).

As already mentioned, the crossflow filtration in the first stage is carried out under pressure. It can be of advantage in this regard to operate under pressure on the latex side and, at the same time, to apply a vacuum on the permeate side.

In one particularly preferred embodiment, a chemically resistant zirconium oxide membrane having a cutoff of approx. 50,000 dalton is used in the crossflow filtration of the first stage.

Semi-permeable membranes having a cutoff in the molecular weight range of <1,000 dalton are used for the second stage of the crossflow filtration according to the invention. Membranes such as these allow water and dissolved substances, which are below the cutoff limit by virtue of their molecular weight, to pass through under low to medium pressures.

The membranes used in the second stage of the crossflow filtration consist of a polymeric organic material which has been modified, predominantly at its surface, by acidic or basic groups.

The polymeric membrane material is a natural semisynthetic or synthetic material containing hydroxy, amino or amido-oxime groups, for example as reactive groups. Materials such as these may be reacted with suitable reagents which contain on the one hand acidic or basic groups and, on the other hand, at least one group capable of reacting to form a chemical (covalent) bond.

The acidic groups are primarily carboxyl or sulfone groups while the basic groups are primary, secondary or tertiary amino groups and also phosphonium or sulfonium groups.

Suitable reactive agents which contain an acidic or basic group and which can be reacted with the basic polymers are, for example, colorless or colored compounds, above all acidic reactive dyes which may be belong to various classes, such as anthraquinone, azo and formazane dyes. They may even be present as metal complexes.

Polymer membranes modified by an azo dye containing sulfonic acid groups are particularly valuable and versatile in their applications. The azo dye may even contain complexed metal, for example copper. Membranes such as these are described, for example, in DE 25 05 254, EP 25 973, EP 26 399 and EP 47 953.

Other suitable membranes for the second stage of the crossflow filtration are, for example, those based on optionally modified polysulfones (cf. EP 61 424), polyamides or polystyrene (see, for example, EP 82 355).

However, anionically modified polyacrylonitrile, polysulfone or cellulose acetate membranes are particularly suitable.

The process according to the invention is particularly suitable for working up PVC, SBR, acrylate, CR, polyvinyl acetate and natural latex dispersions and also dispersions of polybutadiene, acrylonitrile, butadiene latices and mixtures thereof.

Latex dispersions containing the latex in a concentration of 0.1 to 50% by weight and preferably 0.1 to 40% by weight may be concentrated by the process according to the invention.

The process according to the invention is particularly suitable for concentrating latex-containing wastewaters in which the latex is present in a concentration of from about 0.1 to 5% by weight. In this case, concentration of the latex-containing wastewater may be carried out in such a way that the latex content in the concentrate of the first stage is about 10 to 40% by weight. If the starting latex concentrations are higher (for example above 30% by weight), it is possible by the process according to the invention to concentrate the latex dispersion in such a way that the dispersions obtained have a latex content of 50% by weight or more.

If latex-containing wastewater is concentrated by the process according to the invention, it is of advantage to return the concentrate accumulating in the first stage to the preceding latex production process.

The permeate accumulating during concentration in the first stage, which contains various salts, such as sodium chloride and sodium sulfate in addition to the emulsifiers used for production of the latex is returned to the first stage of the crossflow microfiltration after it has also been concentrated (to emulsifier concentrations of 0.05 to 1% by weight and preferably 0.05 to 0.8% by weight and to salt concentrations of 0.1 to 1.5% by weight and preferably 0.15 to 1.0% by weight).

The permeate obtained in the second stage of the crossflow microfiltration, which is substantially free from organic components and salts, may be reused as process water in the latex polymerization process.

It can be of advantage in the process according to the invention continuously to add a small quantity (0.001 to 1.0%, based on the total quantity of latex-containing wastewater) of fresh emulsifier solution to the first stage of the crossflow filtration for further stabilizing the latex to be concentrated. Suitable emulsifiers are any of the types typically used in latex polymerization, such as sodium lauryl sulfate, aryl alkyl sulfonates and/or polyglycol ethers.

The process according to the invention for concentrating latex dispersions may be carried out both continuously and discontinuously.

The advantages of the concentration process according to the invention lie in the fact that there are no significant losses of emulsifier during concentration of the latex, in the fact that the emulsifier is circulated and in the fact that the permeate of the second stage is available as process water and does not enter the wastewater.

It must be regarded as surprising that, during concentration of the latex dispersions in accordance with the invention, the latex dispersion remains stable in the first stage of the crossflow filtration and does not undergo coagulation of the latex, as had been expected, particularly in view of the salt present in the permeate returned to the first stage. The stability of the latex emulsions to be treated by ultrafiltration is a major problem which, hitherto, had only ever been solved by the introduction of additional emulsifiers, as documented by the literature cited at the beginning.

The process according to the invention is illustrated by the following Examples. The membrane flux is expressed in liters permeate per $m^2$ membrane surface per day ($l/m^2 \cdot d$).

EXAMPLE 1

5 $m^3$ SBR latex wastewater having the following composition:

| | |
|---|---|
| 0.61% | SBR latex |
| 0.05% | anionic emulsifier (alkyl sulfonate ($C_{12-20}$ cut) |
| 0.12% | salts |
| 99.22% | water | and a pH value of 7.5 was subjected to ultrafiltration using a zirconium oxide membrane (zirconium oxide on an aluminium oxide carrier membrane having a molecular cutoff of 50,000). The ultrafiltration was carried out under a pressure of 4.4 bar and at a membrane flux of 10,340 $l/m^2 \cdot d$. The average temperature was 38° C. 1 l anionic emulsifier (Mersolat ®K30, a product of Bayer AG) was added every 4 hours and 5 l bactericide (Preventol ®D7, a product of Bayer AG) were added every 24 hours.

More wastewater having the same composition as before was introduced every 8 hours. After an operating time of 80 hours, no more wastewater was introduced, instead the wastewater was worked up.

A 38.5% latex having a pH value of 6.7 was obtained.

Reverse osmosis was started at the same time as ultrafiltration. After a single passage through the membrane, the ultrafiltration permeate was returned in concentrated form to the ultrafiltration receiver. A polysulfone membrane having a cutoff of <300 dalton in the form of a wound module was used as the membrane. Reverse osmosis was carried out under a pressure of 15.9 bar with a membrane flux of 500 $l/m^2 \cdot d$. The average temperature was 38° C.

The reverse osmosis permeate containing 4 mg/l organically bound carbon (TOC) and 9 mg/l inorganically bound carbon (TAC) was collected and returned to the latex production process.

EXAMPLE 2

5 m³ SBR, acrylonitrile/butadiene, acrylate latex wastewater having the following composition:

| | |
|---|---|
| 1.67% | latex mixture having the above composition, |
| 0.08% | anionic emulsifier (alkyl sulfonate ($C_{12-20}$) |
| 0.21% | salts |
| 98.04% | water | and a pH value of 7.6 were subjected to ultrafiltration. A polysulfone membrane having a molecular cutoff of 60,000 was used for this purpose. The ultrafiltration was carried out under a pressure of 4.8 bar with a membrane flux of 3,890 l/m²·d. The average temperature was 35° C. 1 l l anionic emulsifier (Mersolat®K30) was added every 4 hours while 5 l bactericide (Preventol®D7) was added every 24 hours.

Fresh wastewater having the same composition as above was introduced every 20 hours. After an operating time of 120 hours, no more wastewater was added, instead the wastewater was concentrated. A 32.4% latex having a pH value of 6.9 was obtained. Reverse osmosis was started at the same time as ultrafiltration. After a single passage through the membrane, the ultrafiltration permeate was returned in concentrated form to the ultrafiltration receiver. An organic wound module membrane (see Example 1) having a cutoff of <300 dalton was used as the membrane. Reverse osmosis was carried out under a pressure of 15.9 bar with a membrane flux of 500 l/m²·d. The average temperature was 38° C.

The reverse osmosis permeate containing 5 mg/l TOC and mg/l TAC was collected and returned to the latex production process.

We claim:

1. A process for concentrating latex dispersions in a two-stage crossflow filtration, characterized in that in the first state the latex dispersion is concentrated under pressure of 2 to 7 bar and at temperatures of 20° to 70° C. under turbulent flow conditions by means of ultrafiltration using membranes having cutoff limits of 1,000 to 150,000 dalton or by means of a microfiltration using membranes having pore sizes of 0.01 to 0.5 μm, the permeate accumulating together with the emulsifier present therein is then concentrated to 10 to 40 bar and at temperatures of 20° to 50° C. by means of reverse osmosis using membranes having cutoffs of <150 dalton or by means of a nanofiltration having cutoffs of 150 to 1,000 dalton in the second stage and the concentrate obtained is returned with the emulsifier to the first stage of the crossflow filtration process.

2. A process as claimed in claim 1, characterized in that latex dispersions containing 0.01 to 50% by weight latex in the dispersion are concentrated.

3. A process as claimed in claim 1, characterized in that, in the concentration of latex-containing wastewaters having latex concentrations of 0.1 to 5% by weight, the concentrate accumulating in the first stage is returned to the latex production process.

* * * * *